Sept. 22, 1959            E. ALM            2,904,842

METHOD AND MEANS FOR VULCANIZING TIRES

Filed March 14, 1957            2 Sheets-Sheet 1

INVENTOR
ERHARD ALM

ATTY.

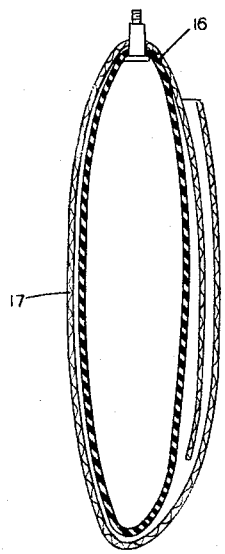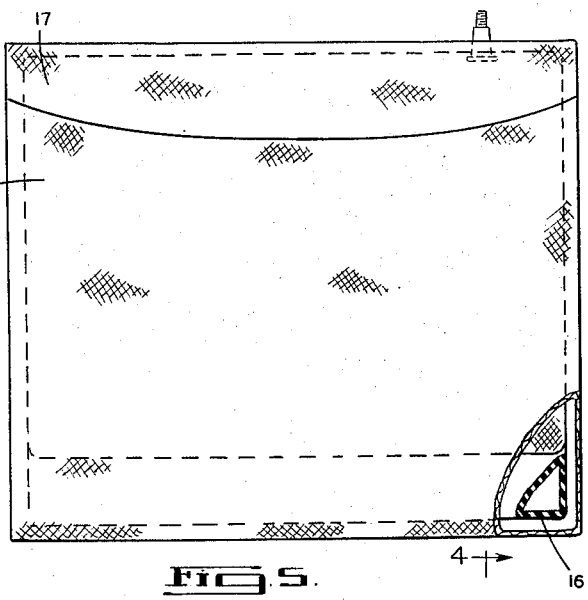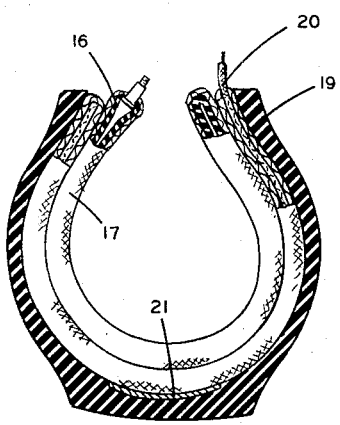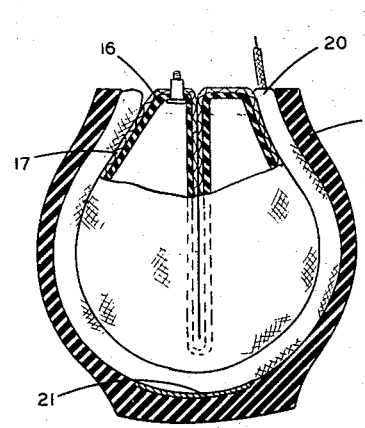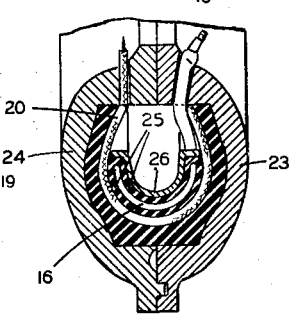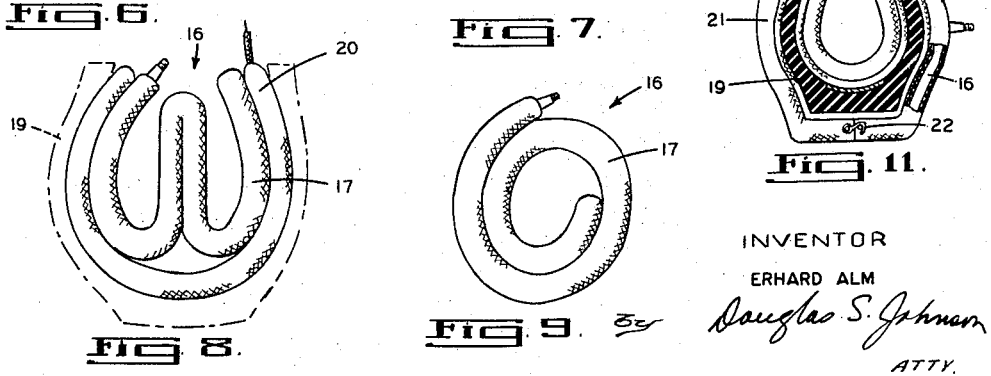
INVENTOR
ERHARD ALM

United States Patent Office 2,904,842
Patented Sept. 22, 1959

2,904,842
METHOD AND MEANS FOR VULCANIZING TIRES

Erhard Alm, Toronto, Ontario, Canada

Application March 14, 1957, Serial No. 646,016

8 Claims. (Cl. 18—53)

This invention relates to improvements in the art of moulding, retreading and vulcanizing tires.

In the vulcanizing, shaping, repairing or retreading of tires, it has been conventional to steam heat the tire in a mould and to conform the tire to the mould by means of a collapsible rim which is inserted into the tire and an air bag generally of the form of an inner tube disposed between the rim and tire. As these air bags are formed of thick rubber and have limited expansibility, a plurality of different sized bags is required for use with tires of different sizes. Moreover, such inflatable devices, when subject to the heat of vulcanizing or curing of the rubber, become impaired, causing the material thereof to become brittle and crack.

It has also been proposed to dispose a solid mandrel inside the tire and to conform the tire to the mandrel as heat and pressure is applied to the tire. As there are substantial variations in the tires, even over a limited range of sizes, it is impossible to have a mandrel which will conform exactly to the shapes of the tires with which it is to be used and, of course, a plurality of different sized mandrels is required to be useful with tires which have any appreciable differences in size.

It is therefore the object of this invention to eliminate the problems experienced with the solid mandrels and inflatable bags, and to enable pressure to be applied within a tire uniformly over its inner surface regardless of the size and shape of the tire.

More specifically, it is the object of the invention to provide a tire wall pressure member which is adapted for application within a tire and which will conform intimately to the inner tire wall regardless of the size and shape of the tire and at the same time will impart adequate pressure to support the tire firmly during the vulcanizing or other operation.

Again it is an object to provide a pressure member as aforesaid which will withstand the heat applied during vulcanizing or other process.

According to the invention the pressure member is constituted by an outer non-expansible flexible planar or flat-lying envelope and an inner captive substantially planar inflatable expansion bag.

In the application of the invention the planar or flat-lying pressure member is introduced into a tire folded upon itself, and pressure air is then introduced into the expansion bag, whereupon the expanding bag fills the planar envelope and acts to unfold same because of the tendency to extend itself to assume the flat-lying or planar disposition, but, because the pressure member is constrained by the walls of the tire the unfolding action results in the urging of the walls of the envelope into intimate contact with the interior tire wall exerting through the envelope uniform pressure on the interior tire wall, the envelope at the same time constraining the bag from expanding unduly in the direction of least resistance.

Another feature of the invention resides in forming the flexible planar envelope as a protective, heat insulating covering for the expansible bag.

These and other objects and features of the invention will become apparent from the following description taken in conjunction with the accompanying drawings, in which:

Figure 4 is a vertical sectional view on the line 4—4 of Figure 5, taken through my entire pressure-applying device.

Figure 5 is a front elevational view, partly broken away, of my device.

Figure 6 is a part vertical sectional, part end elevational view, showing the disposition of the pressure device in the tire prior to inflation.

Figure 7 is a view similar to Figure 6, but showing the pressure-applying device inflated.

Figure 8 is a view similar to Figure 6, but showing an alternative arrangement of folding of the pressure-applying device.

Figure 9 is an elevational view illustrating an alternative arrangement of folding the pressure-applying device prior to its introduction into a tire.

Figure 10 is a vertical sectional view of a conventional vulcanizing machine illustrating the application of my pressure-applying device thereto, and Figure 11 is a part vertical sectional, part end elevational view illustrating the application of my pressure-applying device for applying pressure to both the inside and outside of a tire.

Figure 1:
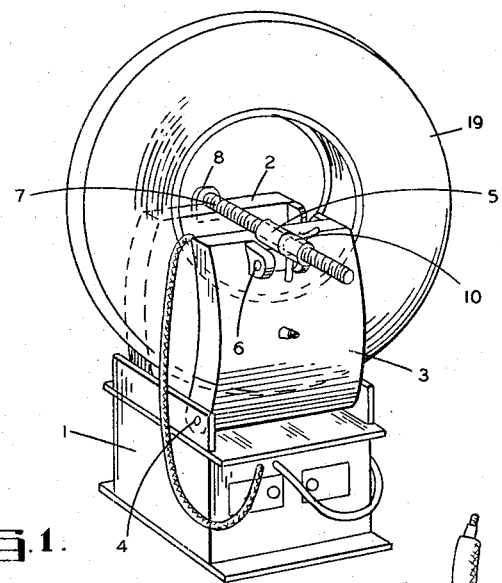
Figure 1 is a perspective view of a vulcanizing machine with which my invention may be used.
Figure 2:
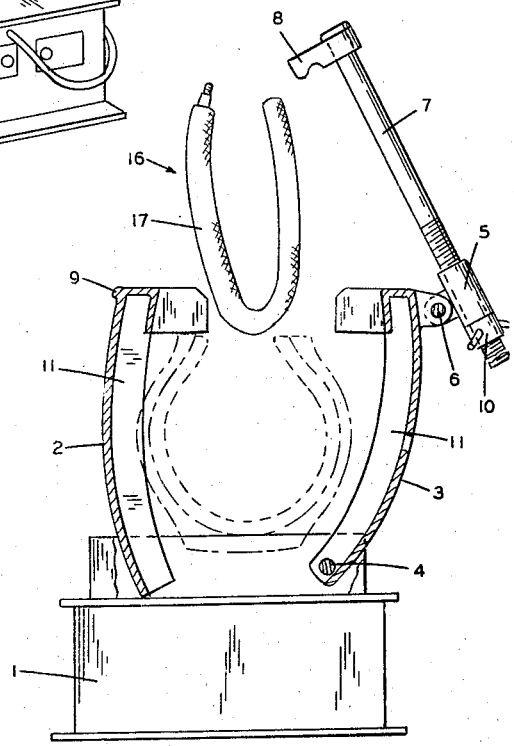
Figure 2 is a transverse mid-vertical sectional view taken through the machine of Figure 1, showing the initial step of introducing my device for applying pressure to the interior of the tire, the heating pads and associated components being omitted for clarity.
Figure 3:
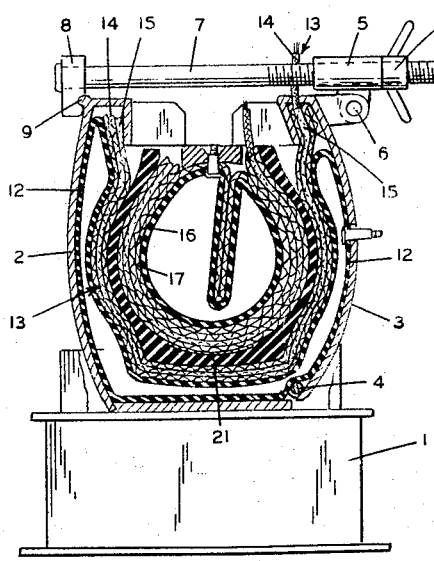
Figure 3 is a view similar to Figure 2 but showing a subsequent step in the application of pressure to the interior of the tire and showing the machine closed preparatory to applying external pressure to the tire.

To illustrate the application of the invention to a vulcanizing machine, reference is to be had to Figures 1 to 3, wherein the machine is shown as comprising a base 1, a recessed fixed side-wall 2, and a recessed pivoted side-wall 3, which is adapted to swing on pivot 4 towards and from the fixed wall 2. The pivoted side-wall 3 carries a sleeve 5 pivoted thereto at 6, and sliding in this sleeve is a clamp screw 7, which is adapted to extend across the top of the sides 2 and 3.

One end of the screw 7 carries a depending lug 8 which is adapted to grip a suitable boss 9 on the fixed side-wall 2. A winged nut 10 engaging the sleeve 5 enables the pivoted side-wall 3 to be drawn towards the fixed side-wall when the screw lug 8 is engaged on the boss 9, as illustrated in Figure 3.

Disposed within the recesses 11 of the side-walls 2 and 3 is an expansible air bag 12 having a planar disposition and which can be conformed about the outer peripheral surface of a tire, and a suitable heater 13 which may comprise an asbestos base 14 having resistance wires woven therein and covered by a suitable material 15, which may be asbestos, canvas, or suitable rubberized material capable of withstanding heat.

The means for applying pressure to the interior of the tire comprises, as best seen in Figures 4 and 5, an inflatable and expansible air bag 16, having substantially a planar disposition and arranged within a planar or flat-lying envelope 17 formed of a flexible non-expansible material capable of withstanding heat. Canvas has been found particularly satisfactory, and also asbestos and Fiberglas cloth.

As illustrated, the envelope 17 comprises a pouch formation closed by a flap 18 adapted to be tucked down into the pouch so that the air bag is fully protected against detrimental effects of direct heat. In use, as illustrated in Figures 2 and 3, the air bag and its encasing envelope in their flattened or substantially planar disposition are folded and introduced into the interior of a tire 19 which has been placed in the machine, the envelope 5 and bag conforming to the inner peripheral surface of the tire 19 at the point where vulcanization is to take place. A heater 20 corresponding to the heater 13 is arranged around the air bag in its envelope in direct contact with the inner tire wall, and the air bag 16 is then inflated.

Introduction of pressure air into the air bag 16 will cause it to expand and extend itself, the internal pressure developed acting to unfold the bag and envelope outwardly but since the bag and envelope are constrained by the tire walls they are prevented from extending with the air bag acting to urge itself and the casing into contact with the heater 20. As pressure is increased within the air bag 16, the air bag envelope and heater 20 will conform intimately to the interior wall of the tire 19 applying uniform pressure throughout the area of contact.

It is to be understood that by virtue of its expansibility, the air bag 16 would tend to expand in the direction of least resistance in the absence of the envelope 17. The envelope 17, however, defines the limits of expansion of the air bag 16, and when the envelope has been filled out into engagement with the interior of the tire, further pressure introduced into the air bag will act to increase the unfolding action of the air bag and envelope, and will apply an increased force resisting inward displacement of the tire under the application of external pressure.

External pressure is applied to the tire through the inflation of the air bag 12, and through the application of a clamping action by means of the clamp screw 7 and winged nut 10. It will be understood that in practice, air should be admitted simultaneously into the air bags 12 and 16 and for this purpose the bags may be connected together to provide communication between their interiors in any suitable manner, or the bags 12 and 16 could constitute a single bag 21 folded as in Figure 11 and connected together at 22. After the requisite internal and external pressure is applied to securely hold the tire 19 in desired shape, heat is then applied through the heaters 13 and 20 to cure any raw rubber 21 employed in the vulcanizing of the tire and to insure the adherence of any patch which has been applied, as will be understood by those skilled in the art.

The invention has application in the other various fields of opertaion wherein work is carried out on tires, such as retreading and moulding, the air bag 16 and envelope 17 in its folded application providing the means of applying internal pressure to the tire, which pressure can be intimately conformed to the desired tire shape.

Figures 6 and 7 illustrate the application of the invention apart from the particular machine of Figure 1, Figure 6 showing the air bag envelope inserted into the tire in folded form prior to inflation, and Figure 7 showing the air bag 16 inflated.

Where the air bag and envelope are to be employed with smaller tires, then they are folded accordion fashion, for instance, as illustrated in Figure 8. Alternatively, they may be coiled, as illustrated in Figure 9, to fit a still smaller tire.

The use of my air bag and envelope also has been found to be extremely beneficial when used with conventional tire vulcanizing moulds 23, 24, as indicated in Figure 10. In this application, before the tire is placed in the moulds and the moulds closed, the air bag and envelope are folded into the tire and a collapsible rim 25 similar to a conventional collapsible rim, except that the central portion 26 in cross section is inverted to be inserted into the tire. Also, if desired, an electric heater 20 may be employed as the air bag is protected therefrom by its envelope 17.

With the mould parts 23, 24 closed as in Figure 10, air is applied to the bag 16 which, constrained between the rim and tire, expands and tends to unfold thereby urging itself into intimate conformity with the interior of the tire to apply uniform pressure thereto throughout the area contacted thereby. Because the air bag and its envelope are inserted into the tire in folded form, they can be used with substantially any tire size, thereby eliminating the necessity of stocking a plurality of the present conventional bags.

With the arrangement of the air bag 16 and its envelope 17, it will therefore be understood that a single inexpensive device can be used with an extremely wide range of tire sizes to provide interior pressure, uniformly applied throughout the entire interior wall. Thus, the need for a plurality of sizes of mandrels or inflatable balloons is dispensed with.

It will be understood that various modifications in the details of the invention may be made within the scope if the appended claims.

What I claim as my invention is:

1. In a tire casing operation wherein pressure is to be applied to a section of the inner wall of a tire casing, the step of folding a substantially flat-lying inflatable pressure member into a tire casing and arranging said folded pressure member to dispose the fold axis in substantially the plane of the tire casing, and the step of inflating said pressure member while constraining the tire casing wall against displacement whereby said pressure member is conformed about the inner tire casing wall under its own unfolding action.

2. In a tire casing operation wherein pressure is to be applied to the inner tire casing wall the step of folding a substantially flat-lying inflatable member having a relatively separable substantially nonexpansible fabric covering about a fold axis which constrains the inflatable member under inflation from extending into its inflated configuration, and inserting same within a tire casing with the fold axis lying substantially in the plane of the casing, then inflating the pressure member while constraining the wall of the tire casing against displacement whereby said inflatable member and covering is conformed about the inner tire casing wall under its own unfolding action.

3. In a tire casing operation wherein pressure is to be applied to the inner tire casing wall, the step of folding a substantially flat-lying pressure member comprising an inner inflatable rubber element having a relatively separable substantially non-expansible fabric covering about a fold axis which constrains the pressure member under inflation from extending into its predetermined configuration, and inserting same within a tire casing and arranging the fold axis to lie in substantially the plane of the tire casing, then inflating the pressure member while constraining the walls of the tire casing against displacement, whereby said pressure member is conformed about the inner tire wall periphery under its own unfolding action.

4. In a tire casing operation as claimed in claim 3 wherein the pressure member is folded upon itself accordion fashion prior to introducing it into a tire casing.

5. In a tire casing operation as claimed in claim 3 wherein the pressure member is rolled upon itself into a spiral form prior to its introduction into a tire casing.

6. In a tire casing operation wherein pressure is to be applied to the inner tire casing wall the step of folding a substantially inflatable flat-lying fluid pressure member upon itself into a U form, introducing such folded pressure member into the tire casing at a point where pressure is to be applied to the tire casing wall with the bottom of the U disposed toward the bottom of the tire casing with the axis of the U disposed in the plane of the tire casing, introducing fluid under pressure into the pressure member while constraining the tire casing wall against displacement whereby the inflated pressure member under its own unfolding action conforms itself into intimate contact with the inner tire casing wall.

7. In the vulcanizing of a tire casing the step of folding a pressure member comprising a substantially flat-lying inflatable and expansible bag having a flexible non-expansible heat resistant fabric envelope therearound upon itself to define a fold axis, introducing said pressure member in its folded form into a tire casing at a point where it is to be vulcanized, and arranging the pressure member to dispose the fold axis in substantially the plane of the tire casing introducing fluid under pressure in to the folded bag to expand and open out same, the non-expansible fabric acting to constrain the bag to fill out and conform said fabric envelope to the outline of the tire casing wall, and at the same time applying external pressure to the outer tire casing wall corresponding to the pressure applied to the interior of the tire casing wall to constrain the tire casing wall against distortion and applying heat during the application of such internal and external pressure to effect tire vulcanizing.

8. In a tire operation wherein pressure is to be applied to the inner wall of a tire casing, the step of folding a substantially flat-lying inflatable pressure member about a fold axis which constrains the inflatable pressure member under inflation from extending into its predetermined configuration and inserting said folded pressure member within a tire casing with the fold axis lying substantially in the plane of the tire casing, then inflating said pressure member while constraining such wall of the tire casing against displacement.

References Cited in the file of this patent
UNITED STATES PATENTS

| | | |
|---|---|---|
| 1,374,570 | Huetter | Apr. 12, 1921 |
| 1,407,718 | Bittaker | Feb. 28, 1922 |
| 1,607,356 | McMahan | Nov. 16, 1926 |
| 1,705,083 | Burke | Mar. 12, 1929 |
| 2,810,931 | Wolfe | Oct. 29, 1957 |

FOREIGN PATENTS

| | | |
|---|---|---|
| 473,634 | Great Britain | Oct. 18, 1937 |